US012705337B2

(12) United States Patent
Vellanki et al.

(10) Patent No.: US 12,705,337 B2
(45) Date of Patent: Aug. 11, 2026

(54) CLOCK INTEGRITY VERIFICATION AND PROTECTION IN AN INTEGRATED CIRCUIT (IC)

(71) Applicant: CIRRUS LOGIC INTERNATIONAL SEMICONDUCTOR LTD., Edinburgh (GB)

(72) Inventors: Amar Vellanki, Cedar Park, TX (US); Brent W. Wilson, Austin, TX (US); Andrew D. Bettilyon, Kyle, TX (US); Wai-Shun Shum, Austin, TX (US); Arun R. Ramani, Austin, TX (US); Nathan D. P. Buchanan, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 207 days.

(21) Appl. No.: 18/460,255

(22) Filed: Sep. 1, 2023

(65) Prior Publication Data

US 2025/0077646 A1 Mar. 6, 2025

(51) Int. Cl.
*G06F 21/54* (2013.01)

(52) U.S. Cl.
CPC .................................... *G06F 21/54* (2013.01)

(58) Field of Classification Search
CPC .......... G06F 21/44; G06F 21/72; G06F 21/76; G06F 21/552; G06F 21/75; G06F 21/87; G06F 21/54; G06F 21/70; G06F 1/06; G06F 1/08
See application file for complete search history.

(56) References Cited

U.S. PATENT DOCUMENTS 5,533,123 A * 7/1996 Force .................... G06F 21/725 713/189
6,772,631 B2 8/2004 Hansen
7,657,722 B1 2/2010 De Angel et al.
8,695,010 B2 4/2014 Frazier et al.
(Continued)

OTHER PUBLICATIONS

U.S. Appl. No. 18/454,307, filed Aug. 23, 2023. (pp. 1-34 in pdf).

*Primary Examiner* — J. Brant Murphy
*Assistant Examiner* — Sayeda Salma Nahar
(74) *Attorney, Agent, or Firm* — Andrew M. Harris; Mitch Harris, Atty at Law, LLC

(57) ABSTRACT

An integrated circuit (IC), including multiple functional units for performing operations of the integrated circuit, provides security of a clock configuration at least during security operations. The IC includes a clock management subsystem for providing one or more clock signals to the functional units. The clock management subsystem is reconfigurable to adjust characteristics of the clock signal(s) or to select from among multiple clock sources from which the clock management subsystem generates the clock signal(s). The IC also includes a security subsystem for performing security operations within the IC and coupled to the clock management system to prevent alteration of a configuration of the clock management subsystem while the security operations are performed. The clock management subsystem performs a clock integrity check in response to the security operations before the security operations are performed. The security operations are not performed if the clock integrity check fails.

20 Claims, 7 Drawing Sheets

(56) References Cited

U.S. PATENT DOCUMENTS

| | | | | |
|---|---|---|---|---|
| 9,171,161 | B2 * | 10/2015 | Anbalagan | G06F 21/57 |
| 2017/0249000 | A1 * | 8/2017 | Ragland | G06F 1/324 |
| 2019/0097785 | A1 * | 3/2019 | Elenes | G11C 7/24 |
| 2023/0315913 | A1 * | 10/2023 | Chandra | G06F 21/575 726/26 |

* cited by examiner

CLOCK INTEGRITY VERIFICATION AND PROTECTION IN AN INTEGRATED CIRCUIT (IC)

BACKGROUND

1. Field of Disclosure

The field of representative embodiments of this disclosure relates to integrated circuits (ICs) including a bus interface with configurable clock circuits and their operating methods. In particular, this disclosure relates to ICs that implement dynamic locks on clock configuration registers during operations that are protected and ICs that verify clock integrity.

2. Background

Securing assets and generally protecting operation has long been important in integrated circuits (ICs) that manage data and devices. In particular, ICs that include and/or implement processing cores may be subject to intrusion by methods such as compromising internal firmware and/or manipulation of clock and control signals in such a manner as to cause the IC to enter disallowed states that can then either bypass security measures, or reveal private tokens, such as encryption/decryption keys that are used to secure digital assets or ensure trusted operation.

Therefore, many ICs currently in-use provide security operations, such as encryption, decryption and signing of assets to verify their validity, in order to protect the assets and/or ensure proper operation even when the ICs may be attacked by unauthorized/malicious connections. In trusted systems, measures to prevent such access or attacks leading to improper operation are generally a requirement for validation of such systems, and a compromise that may be revealed at validation testing, or subsequently in a product stream in production, may lead to costly and catastrophic consequences. In particular, manipulation of clock configuration may provide an attacker with the ability to cause glitches or other improper operation that may then provide access to otherwise protected assets.

Therefore, it would be advantageous to provide ICs having mechanisms for securing a clock configuration against attacks both from external devices and from internal firmware or microcode that might be compromised by an attack.

SUMMARY

Improved security of clock configuration in an IC are provided by an IC and an associated method of operation.

The IC includes a plurality of functional units for performing operations of the IC, and a clock management subsystem for providing one or more clock signals to the plurality of functional units. The clock management subsystem is reconfigurable to adjust characteristics of the one or more clock signals or to select from among multiple clock sources from which the clock management subsystem generates the one or more clock signals. The IC also includes a security subsystem for performing security operations within the IC and coupled to the clock management system to prevent alteration of a configuration of the clock management subsystem while the security operations are performed. The clock management subsystem performs a clock integrity check in response to the security operations before the security operations are performed. The security operations are not performed if the clock integrity check fails.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses ICs that provide security of a clock configuration at least during security operations. The IC includes a clock management subsystem for providing one or more clock signals to functional units of the IC. The clock management subsystem is reconfigurable to adjust characteristics of the one or more clock signals and/or to select from among multiple clock sources from which the clock management subsystem generates the one or more clock signals. The IC includes a security subsystem for performing security operations within the IC and coupled to the clock management system to prevent alteration of a configuration of the clock management subsystem while the security operations are performed. The clock management subsystem performs a clock integrity check in response to the security operations before the security operations are performed. The security operations are not performed if the clock integrity check fails.

Figure 1:
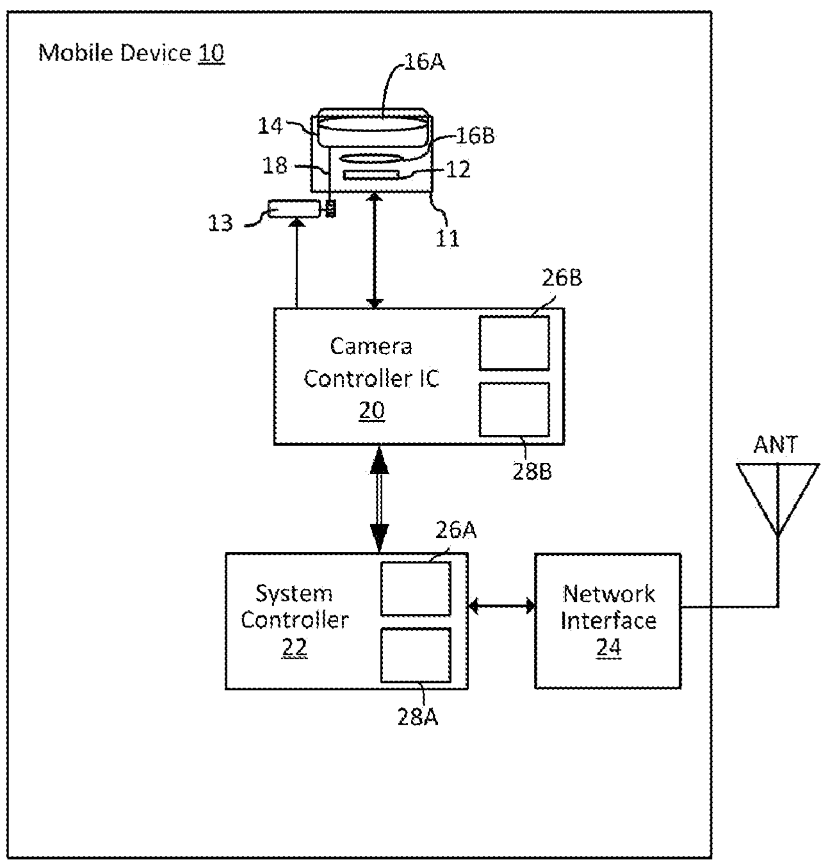
FIG. 1 is a block diagram illustrating an example mobile device 10 implementing example clock validation and control, in accordance with an embodiment of the disclosure.

Referring now to FIG. 1, a block diagram of an example mobile device 10 implementing example clock validation and control is shown, in accordance with an embodiment of the disclosure. Example mobile device 10 may be a wireless mobile telephone, tablet, notebook computer, or a similar device. Alternatively, mobile device may be a digital camera or other system that incorporates a position-controlled image sensor. Operation of mobile device 10 is controlled by a system controller 22, which may be a microcontroller, microprocessor or other processor core, and includes one or more volatile storage units 26A and non-volatile storage units 28A for storage of program instructions and data values. System controller 22 is coupled to a camera controller IC 20, which provides an interface to control and retrieve data from a camera 11, and which includes one or more volatile storage units 26B and non-volatile storage units 28B for storage of program instructions and data values. The program instructions may form a computer-program product in accordance with an embodiment of the disclosure, and the data values may include program data and other data such as media, including digital photographs.

The techniques disclosed herein provide clock validation and control for security within camera controller IC 20, which may be used to secure camera controller IC 20 against attacks that provide access to control of camera 11 and/or access to digital media retrieved from camera 11. System controller 22 is also coupled to a network interface 24 that provides for connection of mobile device 10 to a wireless network via an antenna ANT, but is not required for implementation of embodiments according to the disclosure, for example a camera control system in a mobile device such as a digital camera providing only a wired interface. Camera controller IC 20 includes circuits for controlling one or more motors 13 that position a movable lens 16A or multiple lenses of camera 11, and/or image sensor 12 of camera 11. In the illustrated embodiment, movable lens 16A is positioned by a mount 14, coupled to the one or more motors 13 via a mechanical linkage 18. A mount of image sensor and additional motors (not shown) may be provided to move image sensor 12 in one or more axes, in response to the commands. Camera controller IC 20 provides an interface for receiving data from an image sensor 12 of a camera 11 within mobile device 10 and also a motor controller that controls the one or more motors 13, which may provide zoom, auto-focus and image stabilization functions, by moving lens 16 and/or image sensor 13. Another fixed lens 16B receives an image from movable lens 16A to produce an image of the subject of a photograph or other image processing subject on image sensor 12. Mobile device is only one example of a device in which techniques according to embodiments of the disclosure may be practiced, and the techniques disclosed herein may apply to other types of devices in which clock configuration security and validation of clock signals may be implemented according to embodiments of the disclosure.

Figure 2:
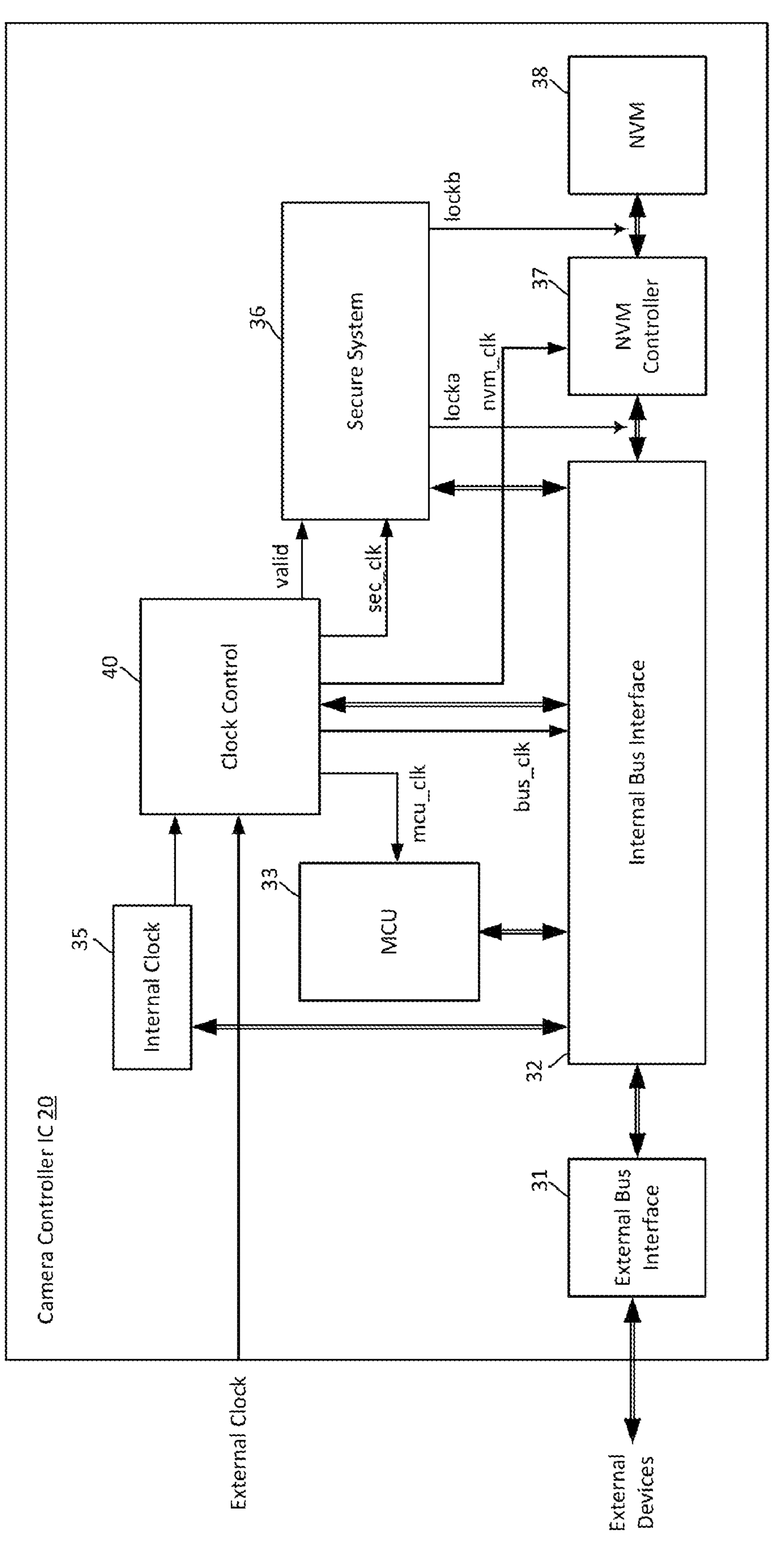
FIG. 2 is a block diagram illustrating an example camera controller IC 20 that may be used to implement camera controller IC 20 of FIG. 1, in accordance with an embodiment of the disclosure.

Referring now to FIG. 2, a block diagram illustrating an example camera controller IC 20 that may be used to implement camera controller IC 20 of FIG. 1 is shown, in accordance with an embodiment of the disclosure. An external bus interface 31 provides for connection of camera controller IC 20 to external devices, such as system controller 22 in mobile device 10 of FIG. 1 via one or more external bus connections, which may implement a serial or parallel interface, and which may be a standardized interface, or a proprietary interface. An internal bus interface 32 couples external bus interface 31 to multiple functional units within camera controller IC 20, including a microcontroller unit (MCU) 33 that manages operations within camera controller IC 20, a secure system 36, which is a security processing circuit that manages secure operations within camera controller IC 20, a non-volatile memory (NVM) controller 37 that manages both secured and unsecured access to an NVM 38, and a clock control circuit 40 that generates various clock signals for the functional units within camera controller IC 20. MCU 53 may be a microcontroller core, a microprocessor, or a logic-implemented state machine, or other suitable circuit for managing operations within camera controller IC 20, depending on the particular required functionality of the device in which camera controller IC 20 is included. MCU 33 receives a clock signal mcu_clk from clock control circuit 40, internal bus interface 32 receives a bus clock signal bus_clk, NVM controller 37 receives a clock signal nvm_clk, and secure system 36 receives another clock signal see_clk, which are intended as illustrative examples of a variety of clock signals required in an application-specific IC (ASIC) such as cameral controller IC 20, but which are not intended to be limiting, but to provide such an example.

Clock control circuit 40 selects between a source clock signal provided by an internal clock generator 35 and an external clock signal External Clock, which may be multiplied and/or divided by clock control circuit 40 to generate above-described clock signals mcu_clk, bus_clk, nvm_clk, and see_clk, according to factors that may be programmable and supplied from external devices via external bus interface 31 through internal bus interface 32. The factors and other parameters, such as selection between the output of internal clock generator 35 and external clock signal External Clock, used by clock control circuit 40 to determine and generate clock signals mcu_clk, bus_clk, nvm_clk, and see_clk may be stored in NVM 38, and the present disclosure sets forth various techniques for securely managing the manipulation of the clock configuration information, i.e., the parameters, stored in NVM 38. In particular, secure system 36 is capable of locking access over the connection between NVM controller 37 and internal bus interface 32, and the connection between NVM 38 and NVM controller 37, for example, during the execution of secure operations, or at any time, such as after factory programming and test, or for example, after a single initialization, depending on the security needs of camera control circuit 20. Lock signals locka and lockb respectively lock the buses between NVM controller 37 and internal bus interface 32, and between NVM 38 and NVM controller 37, respectively, which may be accomplished by isolation of data and address signals, disabling of control signals, or any technique that may be used to prevent transfer over a bus when the corresponding lock signal locka, lockb is asserted by secure system 36. The locking/isolation mechanism described above is just one example of locking that may be performed prior to and during security/protected operations. For example, the connection of the internal bus to clock control circuit 40 may also or alternatively be locked, as may the internal and/or external bus during certain operations.

Figure 3A:
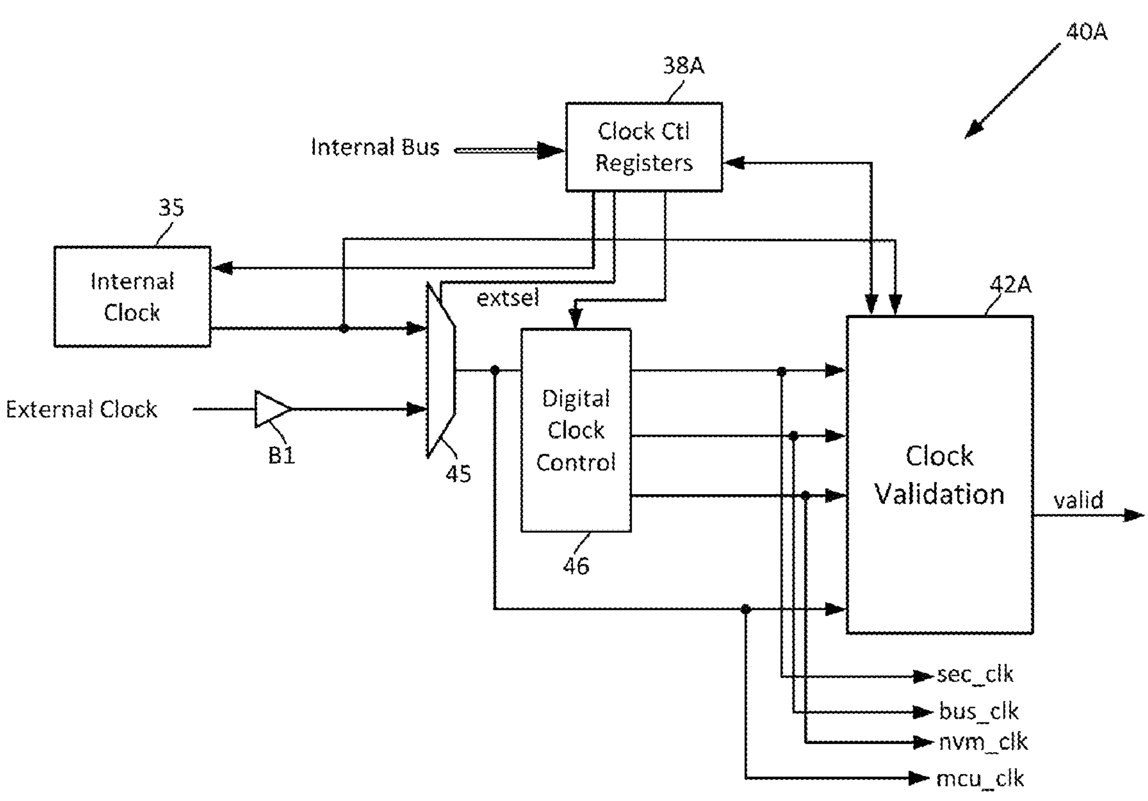
FIG. 3A is a block diagram illustrating details of an example clock control circuit 40A, as may be used to implement clock control circuit 40 of example camera controller IC 20 of FIG. 2, in accordance with an embodiment of the disclosure.

Referring now to FIG. 3A, a block diagram illustrating details of an example clock control circuit 40A, as may be used to implement clock control circuit 40 of example camera controller IC 20 of FIG. 2 is shown, in accordance with an embodiment of the disclosure. Clock control circuit 40A is an example of a clock control circuit that performs validation on the generated clock signals themselves, in contrast to example clock control circuits 40B and 40C, described with reference to FIG. 3B and FIG. 3C, respectively, which validate/control the parameters provided to example clock control circuits 40B and 40C. Each or some of the types of clock control circuits illustrated by clock control circuits 40A, 40B and 40C may be combined in a single clock control circuit that not only checks the parameters provided to clock control circuit 40 of FIG. 2, and prevents mis-programming and malicious manipulation of the clock signals in camera control circuit 20 of FIGS. 1-2, but also performs validation of characteristics of the generated clock signals, providing greatly enhanced security of the clocks generated by clock control circuit 40.

Within clock control circuit 40A, a selector 45 selects between the output of internal clock generator 35 and clock signal External Clock, which is conditioned by a clock buffer B1, according to a control signal extsel provided by a bit of one of a set of clock control registers 38A. In the example, clock signal mcu_clk is a master clock provided to a digital clock control 46 that generates other clock signals bus_clk, nvm_clk, and see_clk, but alternatively, all of clock signals mcu_clk, bus_clk, nvm_clk, and see_clk may be generated from another clock signal. The division factors of programmable dividers/multipliers within digital clock control 46 are provided from clock control registers 38A. Clock signals mcu_clk, bus_clk, nvm_clk, and see_clk are provided to their respective functional blocks as illustrated in FIG. 2, but are also provided to a clock validation circuit 42A that measures characteristics of clock signals mcu_clk, bus_clk, nvm_clk, and see_clk to determine whether or not clock signals mcu_clk, bus_clk, nvm_clk, and see_clk are correct, i.e., they have not been mis-configured, maliciously, or otherwise, in a manner that may compromise security operations and values within camera controller IC 20 of FIGS. 1-2. Clock validation circuit 42A may also perform a check on settings in clock control registers 38A to ensure that the settings in clock control registers 38A are valid, e.g., a check may be performed to determine whether external clock signal External Clock, is selected and may fail validation for that reason. An output of clock validation circuit 42A provides an indication valid, which indicates that the clocks are validly sourced and programmed, and which may be used by other functional blocks, e.g., secure subsystem 36, which may use indication valid to determine whether or not to permit security operations that might expose a private key, or authorize an unauthorized agent, etc.

Figure 3B:
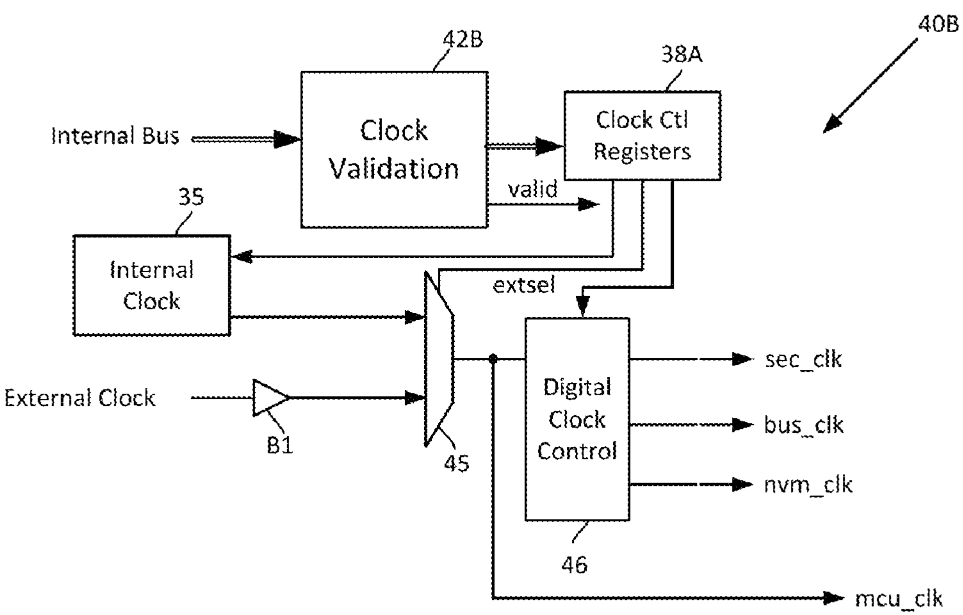
FIG. 3B is a block diagram illustrating details of another example clock control circuit 40B, as may be used to implement clock control circuit 40 of example camera controller IC 20 of FIG. 2, in accordance with another embodiment of the disclosure.

Referring now to FIG. 3B, a block diagram illustrating details of another example clock control circuit 40B, as may be used to implement clock control circuit 40 of example camera controller IC 20 of FIG. 2 is shown, in accordance with another embodiment of the disclosure. Example clock control circuit 40B is an example of a validation/control scheme in which the parameters provided to example clock control circuit 40B from internal bus Internal Bus are validated before permitting the setting of those values in clock control registers 38A to, for example, program factors of dividers/multipliers of digital clock control 46, setting of clock frequency and other characteristics of internal clock generator 35, and selection between external clock signal External Clock and the output of internal clock generator 35. Clock control circuit 40B has some features similar to those of clock control circuit 40B described above, so only differences between them will be described below. Clock validation circuit 42B performs a check on data values provided from internal bus Internal Bus to set values in clock control registers 38A, preventing mis-configuration of clock control registers 38A, at least during security operations as described above. Further details of an example clock validation circuit 42B are provided with reference to FIG. 4B described below, but such clock validation may also be implemented by circuits and techniques as disclosed in pending U.S. patent application Ser. No. 18/454,307, filed on Aug. 23, 2023 and entitled "DYNAMIC OPERATING MODE AND DATASET-BASED REGISTER ACCESS LOCKING", the disclosure of which is incorporated herein by reference, and which is assigned to the same assignee.

Figure 3C:
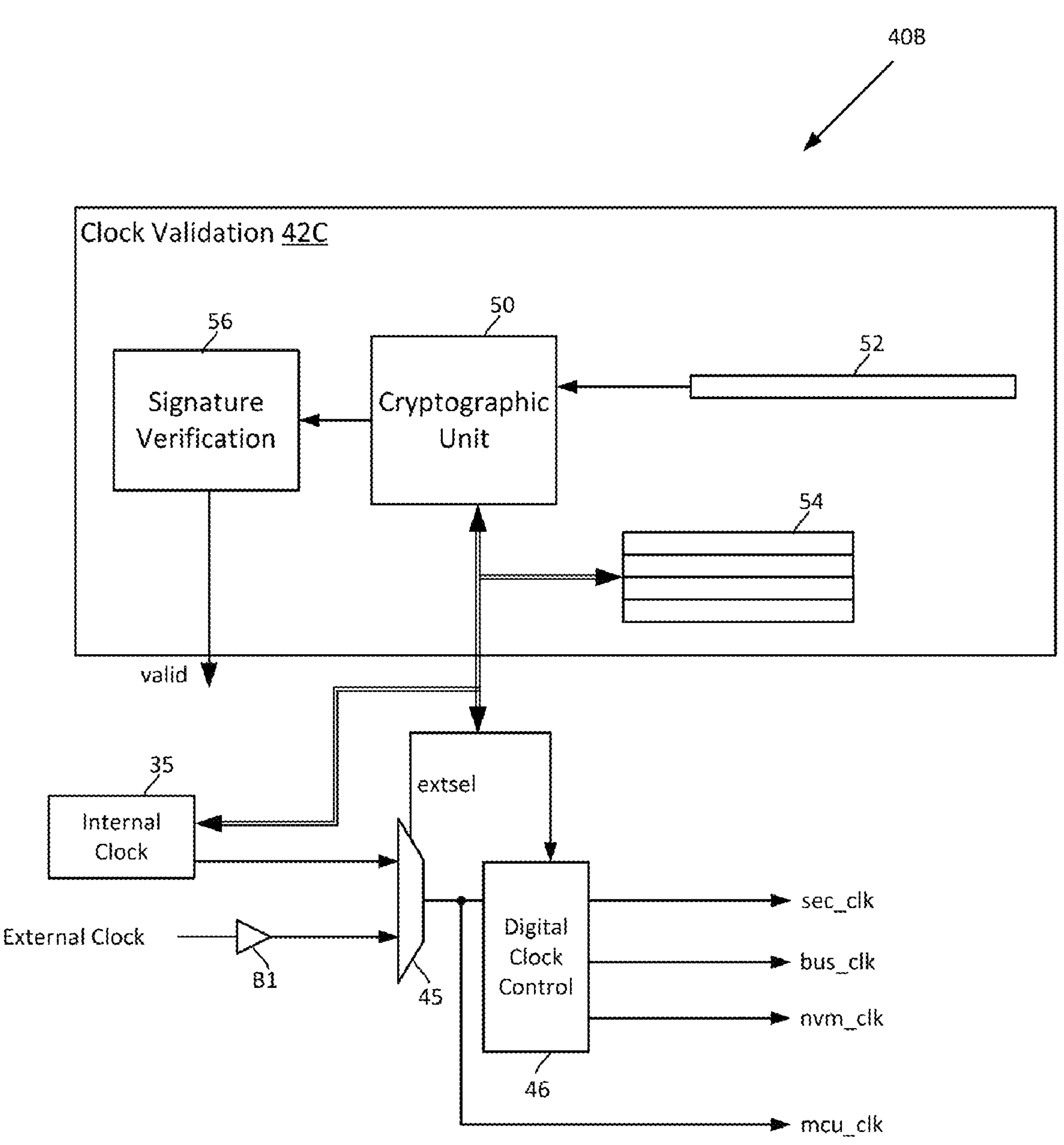
FIG. 3C is a block diagram illustrating details of another example clock control circuit 40C, as may be used to implement clock control circuit 40 of example camera controller IC 20 of FIG. 2, in accordance with another embodiment of the disclosure.

Referring now to FIG. 3C, a block diagram illustrating details of another example clock control circuit 40C, as may be used to implement clock control circuit 40 of example camera controller IC 20 of FIG. 2 is shown, in accordance with another embodiment of the disclosure. Clock control circuit 40C is an example of a clock security scheme in which the clock parameter/control values stored in a set of registers 54 are secured by signatures stored within registers 54 that are used to validate the entity that programmed the clock parameter/control values. A private key 52, generally stored separate from registers 54 and which may be permanently fixed to a common vendor value, or programmed only at factory test, is used by cryptographic unit 50 to generate a signature during a known valid operation, and generally according to a "public" key provided by the agent programming the clock parameter/control values. The resulting signature, which may be a hash or a key generated from a more complex operation by cryptographic unit 50 is then stored in registers 54, so that a signature verification may be subsequently requested, for example, by secured system 36 in clock controller IC 20 of FIGS. 1-2, prior to performing security operations. The values from registers 54 are provided to the remainder of clock control circuit 40C, components of, and operation of which, are described above with reference to FIG. 3A and FIG. 3B.

Figure 4A:
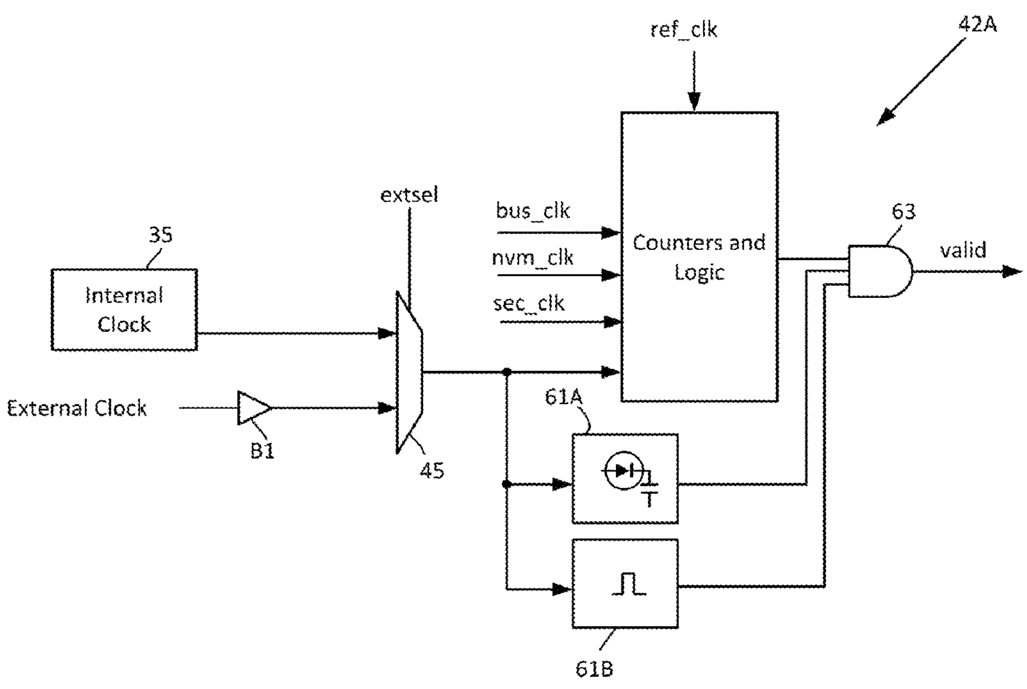
FIG. 4A is a block diagram illustrating details of an example clock validation circuit 42A, as may be used to implement clock validation circuit 42A in example clock control circuit 40A of FIG. 3A, in accordance with an embodiment of the disclosure.

Referring now to FIG. 4A, a block diagram illustrating details of an example clock validation circuit 42A, as may be used to implement clock validation circuit 42A in example clock control circuit 40A of FIG. 3A is shown, in accordance with an embodiment of the disclosure. Example clock validation circuit 42A performs measurements on clock signals mcu_clk, bus_clk, nvm_clk, and see_clk to determine whether or not clock signals mcu_clk, bus_clk, nvm_clk, and see_clk are correct, i.e., they have not been mis-configured. As mentioned above, clock validation circuit may also perform a check on settings in clock control registers 38A to ensure that the settings in clock control registers 38A are valid. A Counters and Logic block 61 implements one or more frequency counters operated by a reference clock signal ref_clk that is generally not configurable. The output of selector 45 (or alternatively just external clock signal External Clock, if selected), may be measured for amplitude characteristics and offset by a detector 61A and the pulse width measured by a minimum pulse width detector 61B, to ensure that the master clock from which the other clock signals is derived is not being manipulated to attack the security of camera control IC 20 by causing glitches using narrow and/or low amplitude pulses, just as Counters and Logic block 61 ensures that the clock generation factors have not been mis-configured to cause improper operation that may expose a private key, or otherwise compromise a secured operation. A logical-AND gate 63 ensures that valid indications are received from each of Counters and Logic block 61, detector 61A and minimum pulse width detector 61B, in order to assert indication valid.

Figure 4B:
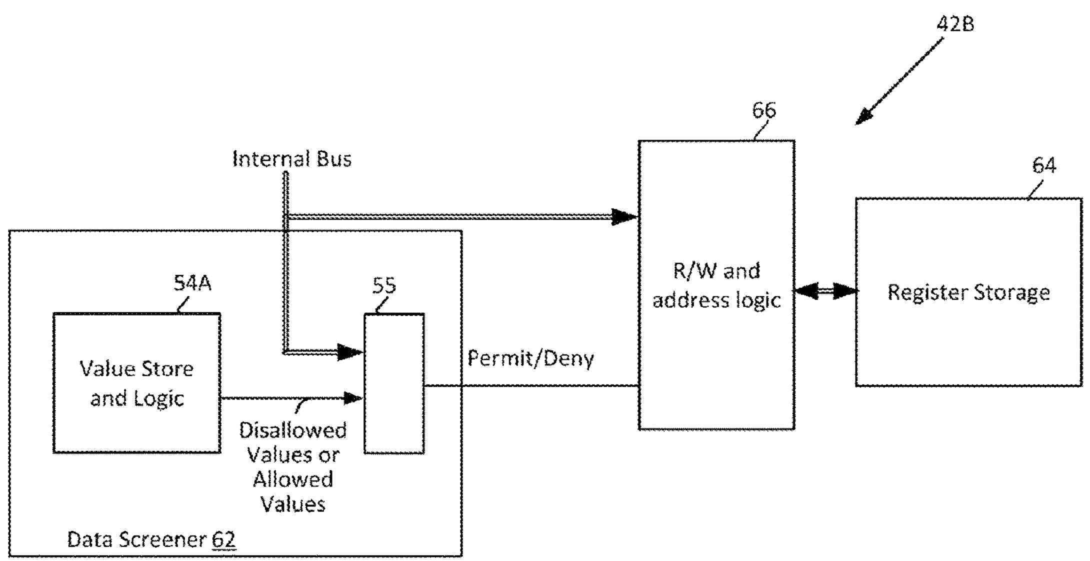
FIG. 4B is a block diagram illustrating details of an example clock validation circuit 42B, as may be used to implement clock validation circuit 42B in example clock control circuit 40B of FIG. 3B, in accordance with an embodiment of the disclosure.

Referring now to FIG. 4B, a block diagram illustrating details of an example clock validation circuit 42B, as may be used to implement clock validation circuit 42B in example clock control circuit 40B of FIG. 3B is shown, in accordance with an embodiment of the disclosure. A data screener 62 includes a Value Store and Logic block that contains either a set of allowed/permitted values for clock control values and parameters being programmed in a register storage 64 by a read/write (R/W) and address logic block 66, before the values can be set. A comparison circuit 55 compares the set of allowed or disallowed values to generate an indication Permit/Deny that signals R/W and address logic 66 to perform or reject a write operation to register storage 64 based on whether the value(s) received from internal bus Internal Bus are in the allowed or disallowed set of control values.

Figure 5:
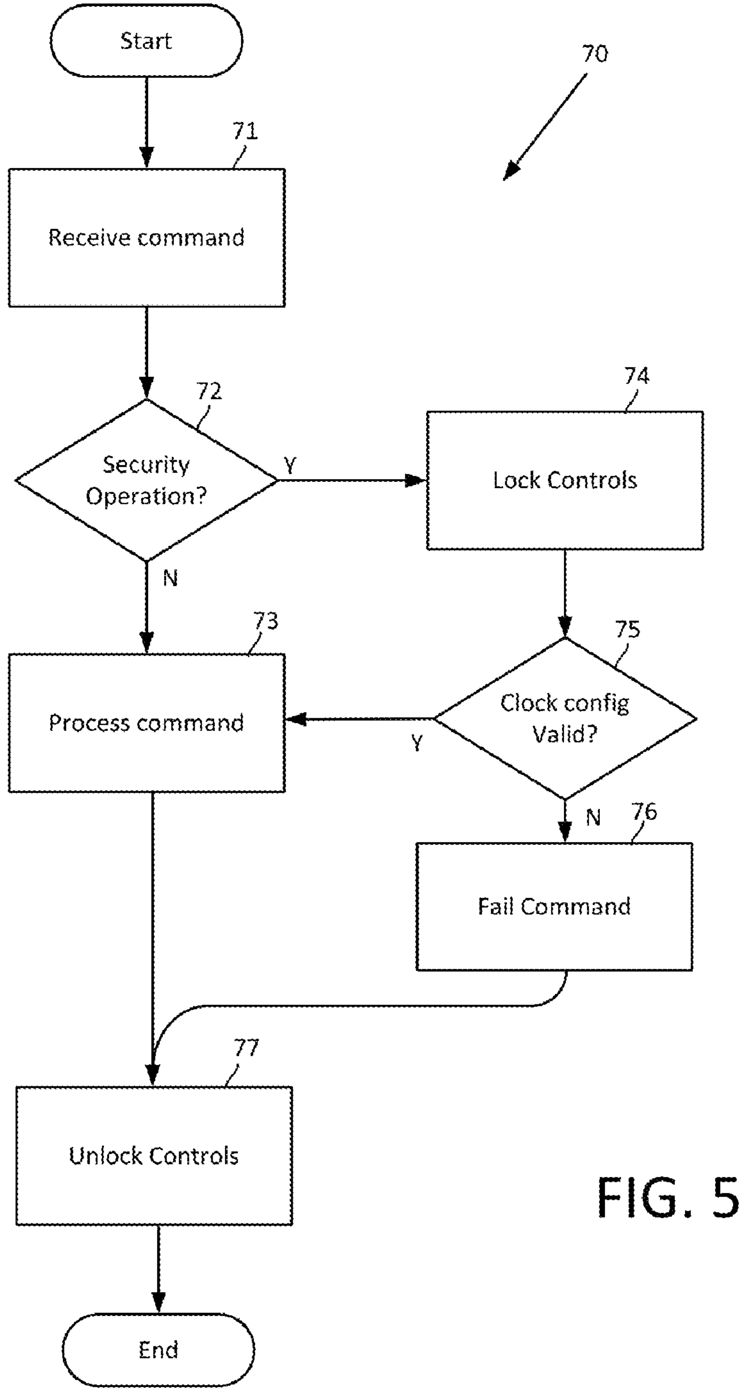
FIG. 5 is an example flowchart 70 illustrating details of operation within camera controller IC 20 of FIG. 2, in accordance with an embodiment of the disclosure.

Referring now to FIG. 5, an example flowchart 70 illustrating details of operation within camera controller IC 20 of FIG. 2 is shown, in accordance with an embodiment of the disclosure. When a command is received (step 71), if the command does not invoke a security operation (decision 72), the command is processed (step 73). If the command invokes a security operation (decision 72), the clock controls are locked (step 74) and the clock configuration is checked for validity (decision 75). If the clock configuration is valid (decision 75), the command is processed (step 76). Otherwise, the command fails (step 76). The clock controls are unlocked (step 77) (if they were locked), after processing is complete.

Figure 6:
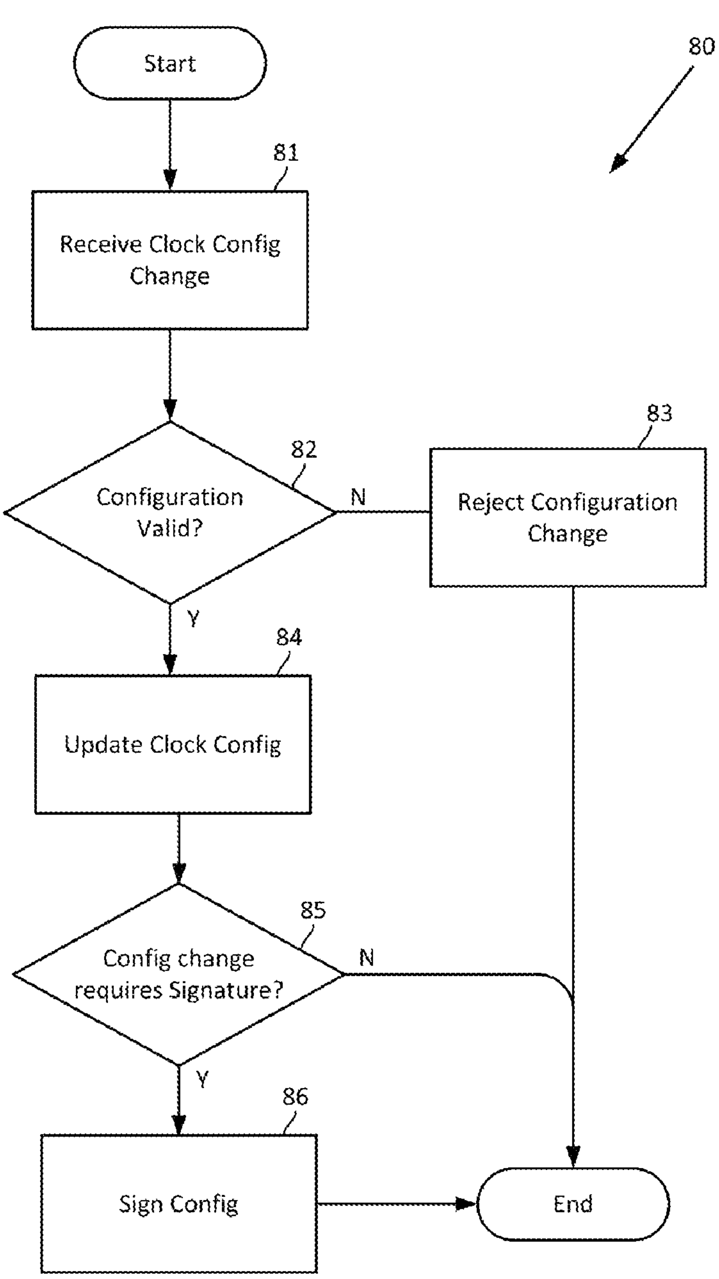
FIG. 6 is an example flowchart 80 illustrating other details of operation within camera controller IC 20 of FIG. 2, in accordance with another embodiment of the disclosure.

Referring now to FIG. 6, an example flowchart 80 illustrating other details of operation within camera controller IC 20 of FIG. 2 is shown, in accordance with another embodiment of the disclosure. When a clock configuration change is received (step 81), if the configuration is not valid (decision 82), the configuration change is rejected (step 83). If the configuration is valid (decision 82), then the clock configuration is updated (step 84). If the configuration change requires a signature (step 85), then the configuration is signed (step 86).

In summary, this disclosure shows and describes ICs and their methods of operation. The ICs may include a plurality of functional units for performing operations of the IC, and a clock management subsystem for providing one or more clock signals to the plurality of functional units. wherein the clock management subsystem may be reconfigurable to adjust characteristics of the one or more clock signals or to select from among multiple clock sources from which the clock management subsystem generates the one or more clock signals. The IC may also include a security subsystem for performing security operations within the IC. The security subsystem may be coupled to the clock management system to prevent alteration of a configuration of the clock management subsystem while the security operations are performed, and the clock management subsystem may perform a clock integrity check in response to the security operations before the security operations are performed. The security operations may not be performed if the clock integrity check fails.

In some example embodiments, the configuration of the clock management subsystem may include one or more of clock selection logic or clock divider/multiplier values. In some example embodiments, the clock management subsystem may perform the clock integrity check by verifying that stored register values that select the configuration of the clock management system are set to valid values. In some example embodiments the security system may prevent alteration of the configuration of the clock management subsystem by asserting a dynamic lock over one or more registers within the IC that hold the stored register values, according to an operating mode of the IC that indicates that one or more of the security operations are to be performed. In some example embodiments, the clock integrity check may include a check of values that control one or more selectable clock frequencies of corresponding ones of the functional units, and the security operations may include processing of a critical transfer operation for which a subset of the one or more selectable clock frequencies is permissible. The security subsystem may prevent writing of the stored register values that correspond to impermissible clock frequencies. In some example embodiments, the security subsystem may perform a check of a signature stored in association with a prior write to the stored register values, to verify that the configuration of the clock management system was set by a trusted device, and the security operations may be performed if the check indicates that the configuration of the clock management system was set by the trusted device.

In some example embodiments, the clock integrity check may confirm characteristics of a clock source from which the one or more clock signals are generated, and the security subsystem may prevent performance of the security operations if the clock integrity check indicates that characteristics of the clock source are not acceptable. In some example embodiments, the characteristics of the external clock source may include one or more of a frequency of the external clock source, a minimum pulse width of the external clock source, an amplitude of the external clock source and a voltage offset of the external clock source. In some example embodiments, the configuration of the clock management system may include selection of the clock source as between an external clock source and an internal clock source, and the clock management subsystem may prevent selection of the external clock source while the security operations are being performed. In some example embodiments, the IC may be a camera control IC incorporating the plurality of functional units, the bus interface controller, the clock management subsystem and the security subsystem. In some example embodiments, the clock management subsystem may perform one or more further clock integrity checks during performance of the security operations.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to a multi-IC subsystem having operating mode-based securing of clock configuration.

What is claimed is:

1. An integrated circuit, comprising:

a clock control circuit for providing one or more clock signals to digital circuits within the integrated circuit, wherein the clock control circuit is reconfigurable to adjust characteristics of the one or more clock signals or to select from among multiple clock sources from which the clock control circuit generates the one or more clock signals; and a security processing circuit for performing security operations within the integrated circuit in response to commands to perform the security operations, wherein the security processing circuit is coupled to the clock control circuit to prevent alteration of a configuration of the clock control circuit while the security operations are performed, wherein the clock control circuit performs a clock integrity check in response to receiving the commands to perform the security operations by verifying that stored register values that select the configuration of the clock control circuit are set to valid values before the security operations are performed, wherein the security operations are not performed if the clock integrity check fails, and wherein the security processing circuit performs the security operations in response to the commands if the clock integrity check succeeds.

2. The integrated circuit of claim 1, wherein the configuration of the clock control circuit includes one or more of clock selection logic or clock divider/multiplier values.

3. The integrated circuit of claim 1, wherein the security processing circuit prevents alteration of the configuration of the clock control circuit by asserting a dynamic lock over one or more registers within the integrated circuit that hold the stored register values, according to an operating mode of the integrated circuit that indicates that one or more of the security operations are to be performed.

4. The integrated circuit of claim 3, wherein the clock integrity check includes a check of values that control one or more selectable clock frequencies of corresponding ones of the digital circuits, wherein the security operations include processing of a critical transfer operation for which a subset of the one or more selectable clock frequencies is permissible, wherein the security subsystem prevents writing of the stored register values that correspond to impermissible clock frequencies.

5. The integrated circuit of claim 1, wherein the security processing circuit further performs a check of a signature stored in association with a prior write to the stored register values, to verify that the configuration of the clock control circuit was set by a trusted device, and wherein the security operations are only performed if the check indicates that the configuration of the clock control circuit was set by the trusted device.

6. The integrated circuit of claim 1, wherein the clock integrity check confirms characteristics of a clock source from which the one or more clock signals are generated, and wherein the security processing circuit prevents performance of the security operations if the clock integrity check indicates that characteristics of the clock source are not acceptable.

7. The integrated circuit of claim 5, wherein the characteristics of the external clock source include one or more of a frequency of the external clock source, a minimum pulse width of the external clock source, an amplitude of the external clock source and a voltage offset of the external clock source.

8. The integrated circuit of claim 6, wherein the configuration of the control circuit includes selection of the clock source as between an external clock source and an internal clock source, and wherein the clock control circuit prevents selection of the external clock source while the security operations are being performed.

9. The integrated circuit of claim 1, wherein the integrated circuit is a camera control integrated circuit incorporating the bus interface controller, the clock control circuit, and the security processing circuit.

10. The integrated circuit of claim 1, wherein the clock control circuit performs one or more further clock integrity checks during performance of the security operations.

11. A method of ensuring integrity of one or more clock signals in an integrated circuit during security operations, the method comprising:

providing one or more clock signals to digital circuits within the integrated circuit from a clock control circuit, wherein the clock control circuit is reconfigurable to adjust characteristics of the one or more clock signals or to select from among multiple clock sources from which the clock control circuit generates the one or more clock signals;

receiving commands to perform the security operations; and responsive to receiving the commands, performing security operations within the integrated circuit, while preventing alteration of a configuration of the clock control circuit while the security operations are performed, and by performing a clock integrity check that stored register values that select the configuration of the clock control circuit are set to valid values in response to the receiving of the commands to perform the security operations before the security operations are performed, wherein the security operations are not performed if the clock integrity check fails, and wherein the security operations are performed in response to the commands if the clock integrity check succeeds.

12. The method of claim 11, wherein the configuration of the clock control circuit includes one or more of clock selection logic or clock divider/multiplier values.

13. The method of claim 11, wherein the preventing alteration of the configuration of the control circuit asserts a dynamic lock over one or more registers within the integrated circuit that hold the stored register values, according to an operating mode of the integrated circuit that indicates that one or more of the security operations are to be performed.

14. The method of claim 13, wherein the clock integrity check includes a check of values that control one or more selectable clock frequencies of corresponding ones of the digital circuits, wherein the security operations include processing of a critical transfer operation for which a subset of the one or more selectable clock frequencies is permissible, wherein the preventing alteration prevents writing of the stored register values that correspond to impermissible clock frequencies.

15. The method of claim 11, further comprising checking a signature stored in association with a prior write to the stored register values to verify that the configuration of the clock control circuit was set by a trusted device, and wherein the security operations are only performed if the check indicates that the configuration of the clock control circuit was set by the trusted device.

16. The method of claim 11, wherein the clock integrity check confirms characteristics of a clock source from which the one or more clock signals are generated, and responsive to the clock integrity check indicating that characteristics of the clock source are not acceptable, preventing performance of the security operations.

17. The method of claim 16, wherein the characteristics of the clock source include one or more of a frequency of the clock source, a minimum pulse width of the clock source, an amplitude of the clock source and a voltage offset of the clock source.

18. The method of claim 16, wherein the configuration of the clock control circuit includes selection of the clock source as between an external clock source and an internal clock source, and wherein the clock control circuit prevents selection of the external clock source while the security operations are being performed.

19. The method of claim 11, wherein the integrated circuit is a camera control integrated circuit incorporating the bus interface controller, the clock control circuit.

20. The method of claim 11, further comprising performing one or more further clock integrity checks during the performing of the security operations.

* * * * *